(12) United States Patent
Xu

(10) Patent No.: US 10,496,208 B2
(45) Date of Patent: Dec. 3, 2019

(54) USER INTERFACE DEVICE HAVING DEPRESSIBLE INPUT SURFACE

(71) Applicant: ROLI Ltd., London (GB)

(72) Inventor: Ning Xu, London (GB)

(73) Assignee: ROLI Ltd., London (GB)

( * ) Notice: Subject to any disclaimer, the term of this patent is extended or adjusted under 35 U.S.C. 154(b) by 52 days.

(21) Appl. No.: 15/799,710

(22) Filed: Oct. 31, 2017

(65) Prior Publication Data

US 2018/0121004 A1 May 3, 2018

Related U.S. Application Data

(60) Provisional application No. 62/415,799, filed on Nov. 1, 2016.

(51) Int. Cl.
| | | |
|---|---|---|
| *G06F 3/041* | (2006.01) | |
| *F21V 3/00* | (2015.01) | |
| *F21Y 115/10* | (2016.01) | |
| *F21W 111/00* | (2006.01) | |
| *G06F 3/16* | (2006.01) | |

(52) U.S. Cl.
CPC .............. *G06F 3/0414* (2013.01); *F21V 3/00* (2013.01); *F21W 2111/00* (2013.01); *F21Y 2115/10* (2016.08); *G06F 3/165* (2013.01); *G10H 2220/096* (2013.01)

(58) Field of Classification Search
CPC .......... G06F 3/0414; G06F 3/165; F21V 3/00; G10H 2220/096; F21Y 2115/10; F21W 2111/00
USPC ....................................................... 345/174
See application file for complete search history.

(56) References Cited

U.S. PATENT DOCUMENTS

| | | |
|---|---|---|
| 2011/0100198 A1 | 5/2011 | Gatzsche et al. |
| 2011/0316793 A1 | 12/2011 | Fushiki |
| 2013/0228435 A1* | 9/2013 | Whitt, III ............. H01H 13/704 200/5 A |
| 2013/0239787 A1 | 9/2013 | McMillen et al. |
| 2014/0083279 A1 | 3/2014 | Little et al. |
| 2015/0046808 A1 | 2/2015 | Dejban et al. |
| 2016/0124559 A1 | 5/2016 | Linn |
| 2017/0047056 A1 | 2/2017 | Lee et al. |

FOREIGN PATENT DOCUMENTS

WO 2016/053068 A1 4/2016

OTHER PUBLICATIONS

Search Report for British Patent Application 1618448.3, dated Apr. 26, 2017.
U.S. Appl. No. 15/799,584, Office Action dated Dec. 14, 2018, 22 pages.

* cited by examiner

*Primary Examiner* — Rodney Amadiz
(74) *Attorney, Agent, or Firm* — Merchant & Gould P.C.

(57) ABSTRACT

Disclosed herein is a user interface device comprising a sensing layer for sensing variable input forces and outputting a corresponding variable signal; a depressible input layer arranged to receive an input force from a user and transfer the input force towards the sensing layer; an intermediate layer arranged between the sensing layer and the depressible input layer, wherein the intermediate layer defines at least one hole through which air from in between the depressible input layer and the intermediate layer can escape.

19 Claims, 7 Drawing Sheets

USER INTERFACE DEVICE HAVING DEPRESSIBLE INPUT SURFACE

This application claims priority to U.S. Provisional patent application Ser. No. 62/415,799, filed 1 Nov. 2016, which application is incorporated herein by reference. To the extent appropriate, a claim of priority is made to the above disclosed application.

FIELD

The present disclosure relates generally to a user interface device. More specifically, but not exclusively, it relates to a backlit user interface device that is sensitive to the pressure and position of impacts and movements created by a user on a depressible input surface. Such interactions are converted into electronic control signals which serve as the input to a processor, for example a data processor. Some applications disclosed herein may be to provide an interface for a musical instrument, to assist in the manipulation of graphical data, or to improve control of electromechanical systems in applications such as automotive, aerospace, industrial, and medical control.

BACKGROUND

Since the advent of electronic devices there has been extensive research and development in the creation and advancement of electronic musical instruments. Some electronic musical instruments are specifically arranged to emulate their acoustic equivalents, while others are designed to enable musicians to create new and exciting sounds.

Most musical instruments provide various means for controlling characteristics of pitch and volume. Many acoustic musical instruments allow musicians to vary these properties as a note is played, and to influence the timbre of sounds, which may be affected by characteristics of the way in which the instrument is played. For example, characteristics can be imparted on the sounds made by an acoustic musical instrument by a musician playing the instrument adding effects such as vibrato. This control of the sound made by an instrument provides musicians with their own musical personality. There has always been a desire to impart such personality to the sounds produced by electronic instruments.

Electronic musical instruments generally produce signals that are sent to a processor arranged to create one or more sounds responsive to inputs from a user on an interface. It is particularly easy to process electronically originated sounds in order to vary many different characteristics of the sounds. However, a problem for engineers producing electronic musical instruments is the development of a user interface that gives the user control over such characteristics of the sound at their fingertips, as is possible with most acoustic musical instruments. Hence, the development of the interface for electronic musical instruments is of particular importance for providing musicians with increased and improved natural control of the instrument.

A further consideration concerns the fact that acoustic instruments often provide both tactile and visual feedback to the user, such as the sounding of a note in combination with the bending of a string or the depression of a key. Providing a similar quality of multi-sensory feedback to musicians using electronic instruments can be difficult.

SUMMARY

In accordance with an aspect of the disclosure there is provided a user interface device. The user interface device may comprise a sensing layer for sensing variable input forces and outputting a corresponding variable signal. A depressible input layer may be arranged to receive the input force from the user and transfer the input force towards the sensing layer. An intermediate layer may be arranged between the sensing layer and the depressible input layer, wherein the intermediate layer may improve air venting capabilities by defining at least one hole through which air from in between the depressible input layer and the intermediate layer can escape. This has the advantage of improving sensitivity to user input by reducing the chance of the trapped air forming bubbles under the depressible input layer.

In an exemplary arrangement, the intermediate layer may be a planar sheet having a first planar surface, a second planar surface and an edge and wherein the at least one hole may be provided between the first and second planar surfaces. At least the depressible input layer, intermediate layer and sensing layer may form a stack of layers. The stack of layers may further comprise one or more openings such that air that has escaped from in between the depressible input layer and the intermediate layer can escape from the stack of layers. The intermediate layer may be connected to the sensing layer and this connection may occur around the edge of the sensing layer. In an exemplary arrangement, the intermediate layer may be connected to the sensing layer via an adhesive. One or more openings may be provided within the adhesive such that air that has escaped from in between the depressible input layer and the intermediate layer can escape from the stack of layers. The adhesive may be printed around the perimeter of either side of a first independent layer, where this first independent layer may be situated between the intermediate layer and the sensing layer.

The structural integrity of the device may be enhanced if the intermediate layer is of greater rigidity than the depressible input layer such that it provides support to the depressible input layer.

In one exemplary arrangement, the intermediate layer may be connected to the depressible input layer. This has the advantage of improving the accuracy of mapping user inputs from the depressible input layer towards the sensing layer. The intermediate layer may be connected to the depressible input layer via an adhesive that is printed on either side of a second independent layer, wherein this second independent layer may be situated between the intermediate layer and the depressible input layer.

The sensing layer may comprise at least one sensing area and at least one non-sensing area, wherein the sensing area may be arranged to sense an input from a user. The intermediate layer may be connected to the sensing layer only at non-sensing areas of the sensing layer. This has the advantage that potentially damaging pulling and/or shear forces are prevented from being transferred to the sensing areas of the sensing layer. At least one sensing area of the sensing layer may comprise a plurality of sensing elements arranged in an array. One or more of the sensing elements of the array may be adjacent to the one or more non-sensing areas of the sensing layer.

The sensitivity of the device may be enhanced by one or more actuators, which may be force redirection elements, arranged to direct the input force from the depressible input layer towards the at least one sensing area of the sensing layer and away from the one or more non-sensing areas of the sensing layer.

The depressible input layer may comprise one or more light transmitting areas at least at the locations corresponding to the non-sensing areas of the sensing layer, wherein the light transmitting areas are arranged to enable light to be transmitted through the depressible input layer. The user interface device may further comprise one or more light sources configured to transmit light through or from at least one of the one or more light transmitting areas of the depressible input layer. All layers and structures below the depressible input layer and above the light source may be configured to allow at least some light to pass through the respective layers to reach at least some of the one or more light transmitting areas of the depressible input layer to be seen by the user. This enhances the ability of the device to provide the user with visual feedback and information.

In an exemplary arrangement, at least the sensing layer, intermediate layer and depressible input layer of the user interface device may be arranged in a stack. A frame may be arranged around the perimeter of this stack of layers, such that the frame is configured to support one or more of the stack of layers.

In one exemplary arrangement, the sensing layer, intermediate layer and depressible input layer may be arranged in a stack and further comprise a frame around the perimeter of this stack of layers, such that the frame provides some form of mechanical support or containment to the layers. The user interface device may be configured such that the layers in combination comprise an apparatus for controlling signals and/or parameters in at least three dimensions, wherein a first and second dimension are provided by the capacity of a user to register an input across two dimensions of a surface of the depressible input layer, and a third dimension is provided by the capacity of a user to register an input by means of variable pressure directed perpendicularly into the depressible surface.

In one exemplary arrangement, the user interface device may be a musical instrument configured to provide variable control of an audio signal.

BRIEF DESCRIPTION OF THE DRAWINGS

Exemplary arrangements of the disclosure shall now be described with reference to the drawings in which.

Throughout the description and the drawings, like reference numerals refer to like parts. The figures are not to scale.

DETAILED DESCRIPTION

Figure 1:
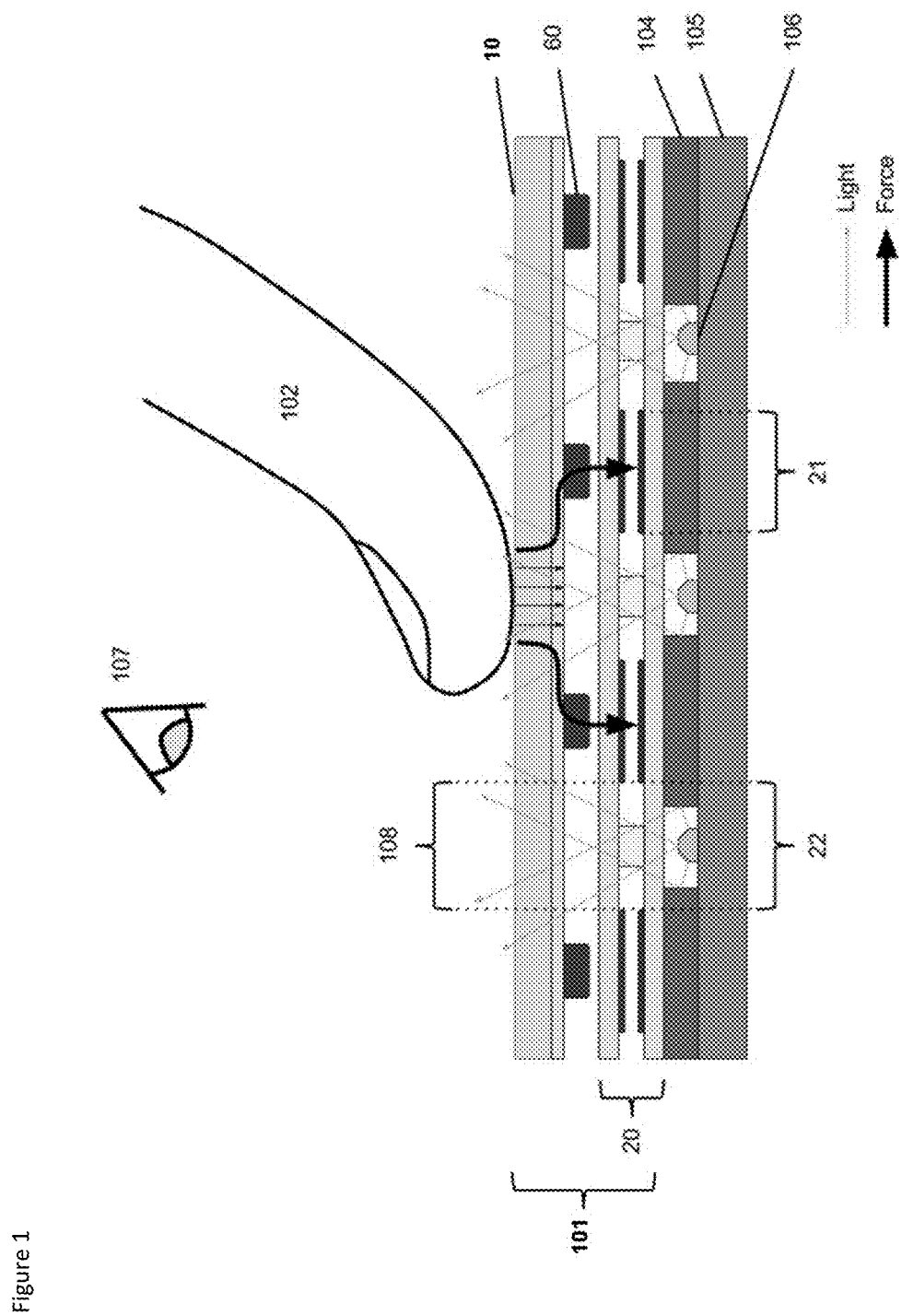
FIG. 1 is cross section view of various components of a user interface device.

FIG. 1 shows a cross section of a simplified view of the user interface device 100. The user interface device comprises a stack of layers 101 including a PCB 105, on which a sensing layer 20 is mounted. The sensing layer 20 defines sensing areas 21 and non-sensing areas 22. The sensing areas 21 are arranged to detect variations in applied pressure.

The PCB provides electrical connections to the sensing layer 20 via sensor panel 104, which is provided just in the sensing areas 21. A plurality of LEDs 106 is provided underneath the non-sensing areas 22 of the sensing layer 20. Each individual LED is placed in openings in the sensor panel 104. The LEDs provide visual feedback to the user. The non-sensing areas 22 of the sensing layer 20 are transparent so as to allow light to pass through. The other layers in the stack of layers 101 also comprise light transmitting regions at corresponding locations, such that the light from the LEDs 106 travels through the stack 101 to be seen by the user 107 and gives the impression of an array of discrete lit areas 108. A depressible input layer 10 is provided on a top surface of the stack 101. A layer of force redirection elements 60 protrudes in a direction from the depressible input layer 10 towards the sensing layer 20.

In operation, the user applies a pressure, for example via a finger 102, to a location on the depressible input surface 10 and this pressure is transferred towards the sensing layer 20 for detecting the applied pressure. The user will be naturally drawn to provide inputs at these lit areas, which is problematic given that the lit areas 108 correspond to the non-sensing areas 22 of the sensing layer. The layer of force redirection elements 60 are therefore provided to direct the input forces away from the non-sensing areas 22 and towards the sensing areas 21. Consequently, improved quality of pressure detection is provided by the user interface device 100 and the life of the LEDs is increased because they are subjected to less pressure, which can cause problems over time.

Figure 2:
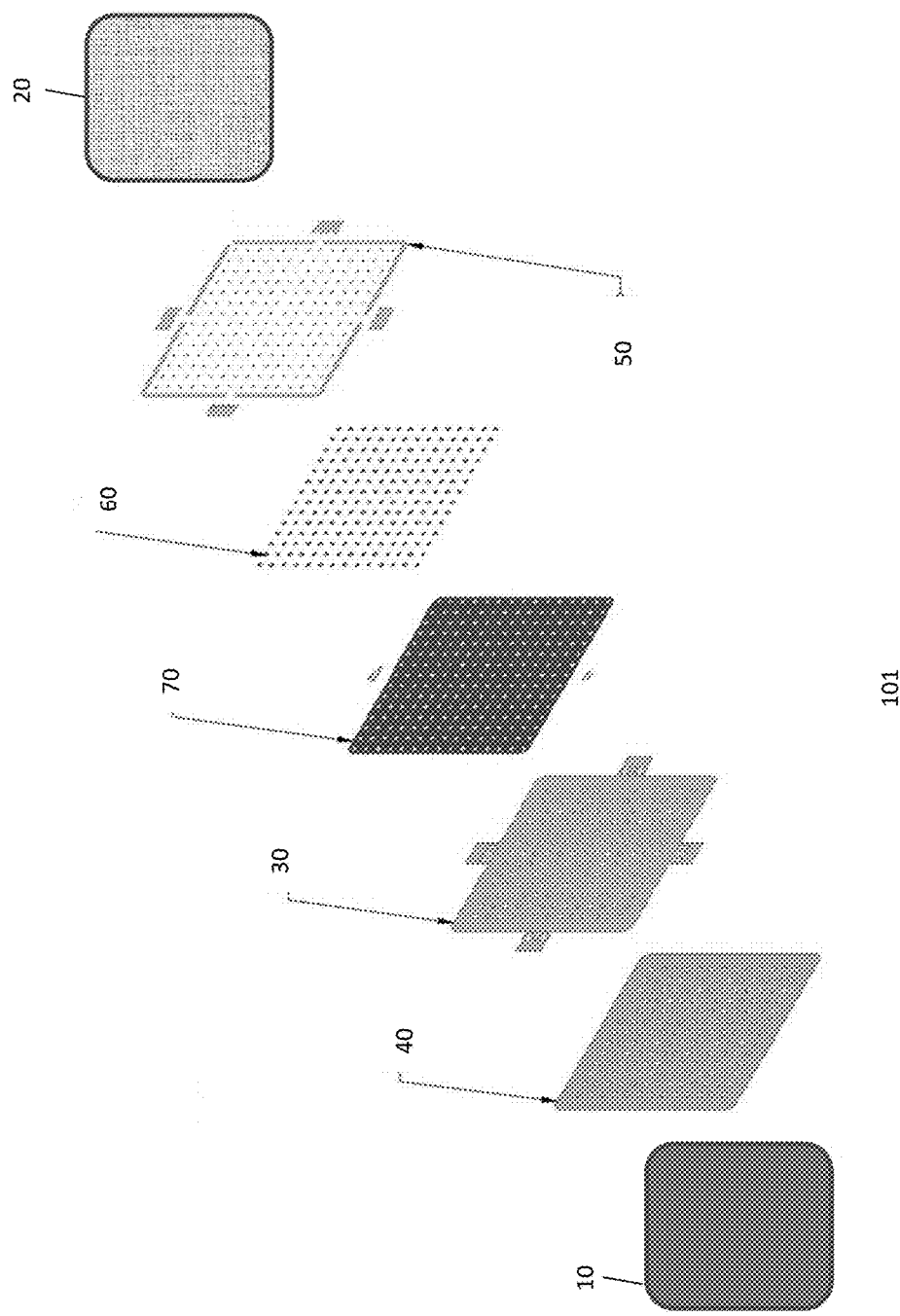
FIG. 2 is an exploded view of a stack of layers of the user interface device.

FIG. 2 illustrates an exploded view of the stack of layers 101. Each layer will now be discussed in detail in turn. Each layer is taken to comprise a planar, primarily two dimensional surface, with a first surface, a second surface and an edge. In this arrangement and orientation, the first surface is an upper side of the layer and the second surface is a lower side of the layer.

Layer 10 is a depressible input layer comprising a bulk filling of soft resilient material which can be depressed when a force is applied by a user, for example via a finger. In this example, the depressible input surface 10 is made from silicone elastomer, but it will be appreciated that any suitable depressible material could be used. The top surface of layer 10 is finished with a different material to provide resilience to user interaction and give a defined colour and texture. The bottom surface of layer 10 is left untreated. Input forces compress or compact the input layer 10 and are thereby transferred from the input layer 10 towards the sensing layer 20. The sensing layer 20 will now be described in greater detail.

Figure 3:
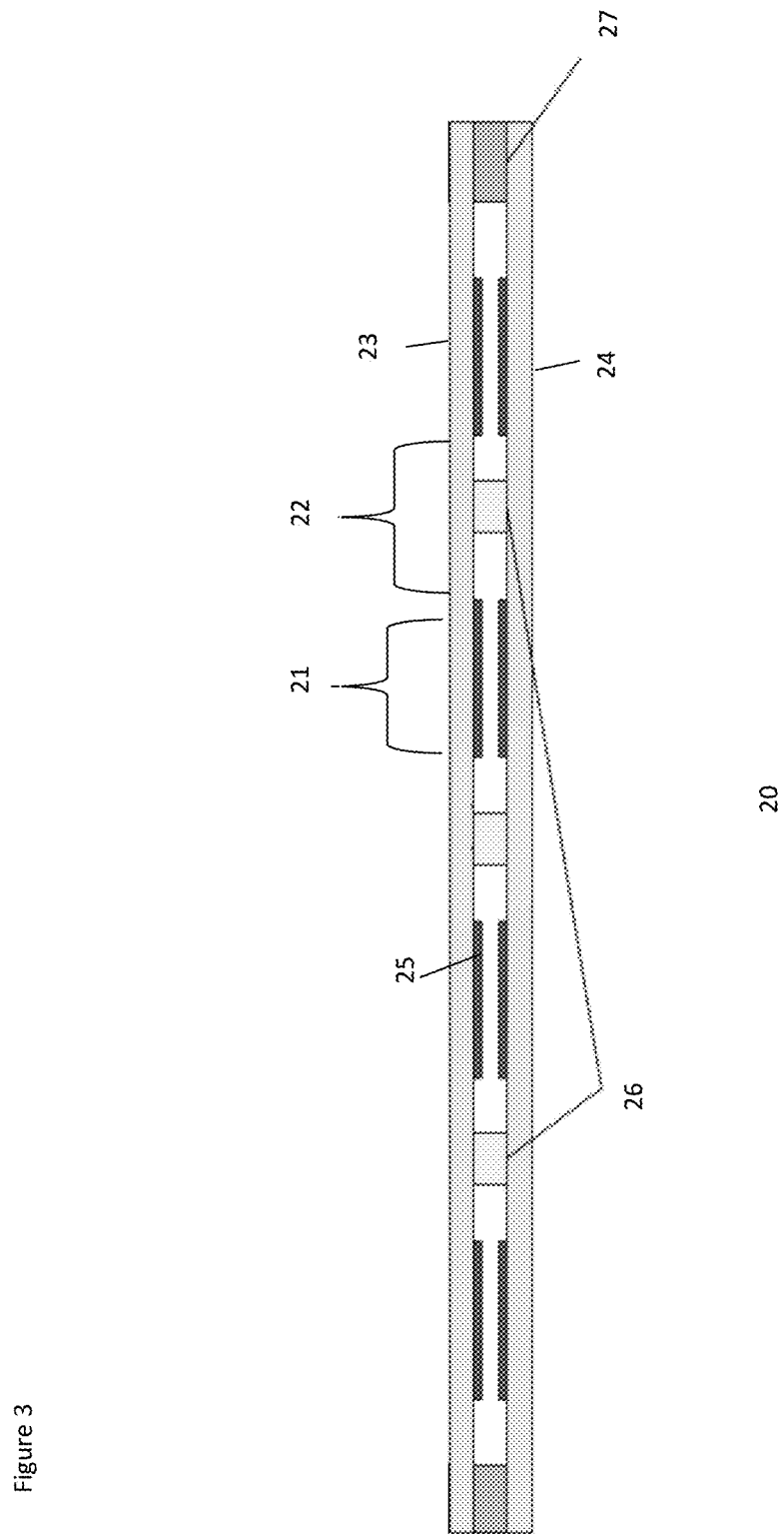
FIG. 3 is a side-on view of a sensing layer, shown in greater detail.
Figure 4:
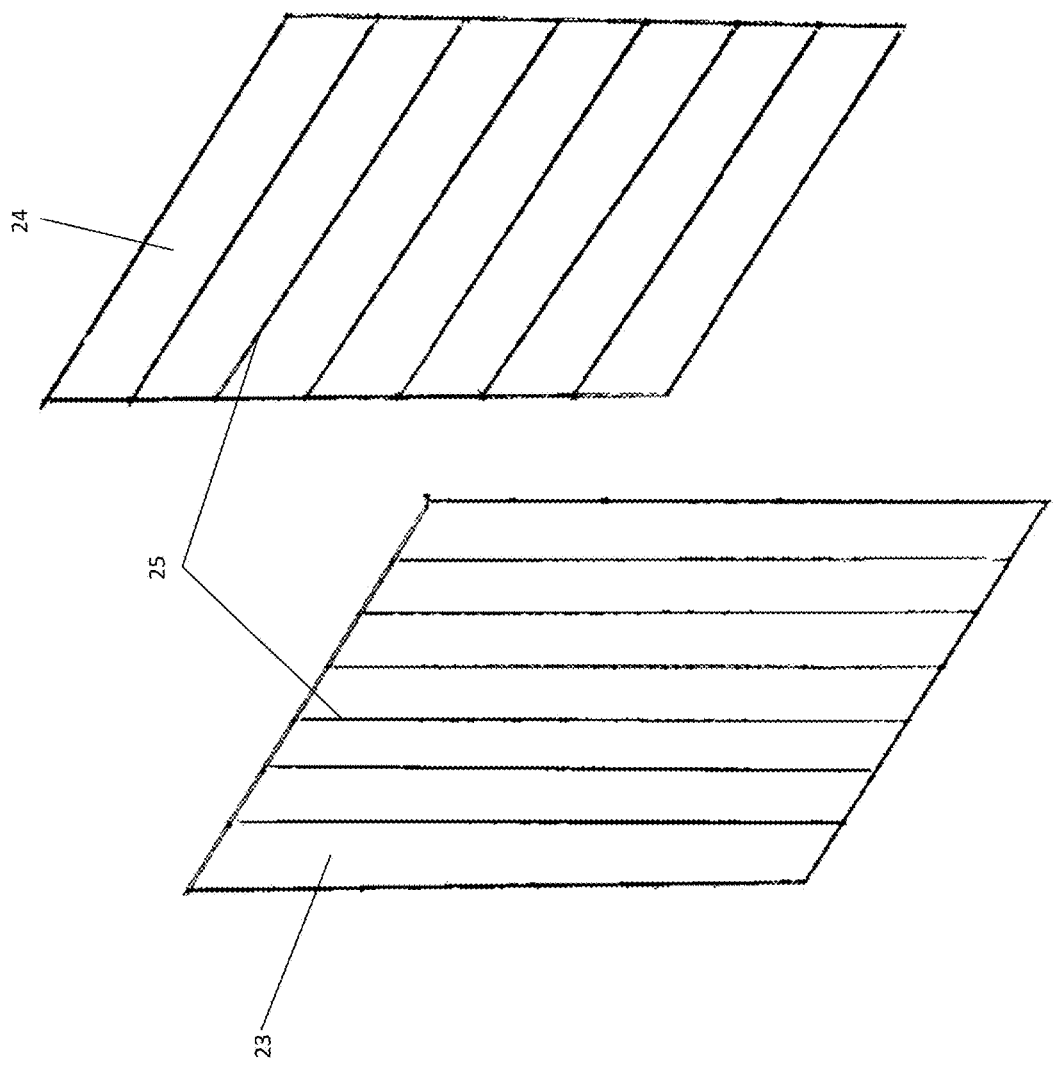
FIG. 4 is a simplified exploded view of how the sensing areas of the sensing layer are configured.

Turning now to FIGS. 3 and 4, the sensing layer 20 is illustrated in greater detail. FIG. 3 shows the sensing layer 20 from a side cross-sectional perspective. The sensing layer 20 comprises a membrane pressure sensor grid. In addition, the sensing layer 20 comprises sensing areas 21 which define non-sensing areas 22. In this example, the sensing areas 21 arise from a first flexible membrane 23 and a second flexible membrane 24 each comprising a plurality of printed conductive features 25 that face one another at certain locations. FIG. 4 shows a simplified exploded view of these flexible membranes 23, 24 comprising the conductive features 25. As can be seen, each printed conductive feature 25 is an elongate conductive strip. Each flexible membrane comprises a plurality of evenly spaced parallel elongate conductive strips. The elongate strips are configured to converge at a tab which is electrically connected to a processing unit that allows changes in current flow to be detected. The first and second flexible membranes are arranged to overlay one another such that their respective elongate conductive strips are perpendicular to one another. In this arrangement, the first flexible membrane 23 is arranged to be the top flexible membrane and the second flexible membrane 24 is arranged to be the bottom flexible membrane. The locations where the conductive features 25 from each of the respective flexible membranes cross one another, and therefore face one another, correspond to the sensing areas 21. The conductive features therefore define an array of sensing areas. Due to the arrangement of the conductive features these sensing areas are provided in an evenly spaced array. The conductive features 25 also define the non-sensing areas 22 which correspond to locations where no conductive features 25 exist. These non-sensing areas 22 are configured to be transparent such that light from a light source situated behind the sensing layer 20 can pass through the non-sensing areas 22 of the layer. The non-sensing areas 22 are therefore light transmitting areas, which are able to transmit light from a light source behind the sensing layer. As shown in FIG. 1, the light source can be LEDs 106 arranged between the sensor panel 104 that electrically connect the sensing layer 20 to the PCB 105.

The sensing layer works as follows. An input force transmitted from the input layer 10 towards the sensing layer 20 forces the top flexible membrane 23 to bend towards the bottom flexible membrane 24, such that one or more pairs of conductive features 25 may contact. Contact between the conductive features 25 closes a circuit though which a current can pass. The area of contact between the conductive features 25 scales with the amount of input pressure applied to input layer 10, and current flow scales with the area of contact. Thus, variations in current flow correlate with variations of input pressure. This forms the basis of a pressure sensitive means for controlling a signal. To prevent unintentional contact between the conductive features 25, the top flexible membrane 23 and the bottom flexible membrane 24 are separated by adhesive spacers 26. These adhesive spacers 26 also have the advantage of reducing noise and providing a reactive force to the user. To further improve the adhesion of the top membrane 23 to the bottom membrane 24, a border adhesive 27 is also provided.

The current flowing through the conductive features 25, which is indicative of the sensed pressure, is passed through the PCB 105 and may be outputted to a processor. The processor is then arranged to produce or process a sound based on the sensed pressure. In this arrangement the processor is external to the user interface device, but in some arrangements the processor may be integrated with the user interface device.

Turning back to FIG. 2, if the input layer 10 were connected directly to the sensing layer 20, accurate registration of user inputs onto the sensor layer would be difficult to achieve due to the soft, elastic nature of the depressible input surface. Air bubble formation arising from air becoming trapped between the soft, flexible input layer 10 and the sensing layer 20 could cause misregistration of the 2D sensor grid and inconsistency in the pressure sensing response across the grid. Further, pulling and shear forces transferred from the input layer 10 to the sensing layer 20 could damage the sensing layer 20, for example through delamination, whereby the top sensing membrane 23 is pulled away from the bottom sensing membrane 24. The disclosure seeks to mitigate these problems by providing a stack of intervening layers between the input layer 10 and the sensing layer 20 which improve the functionality of the device. One of these layers is an intermediate layer 30 which will now be described in greater detail.

Figure 5:
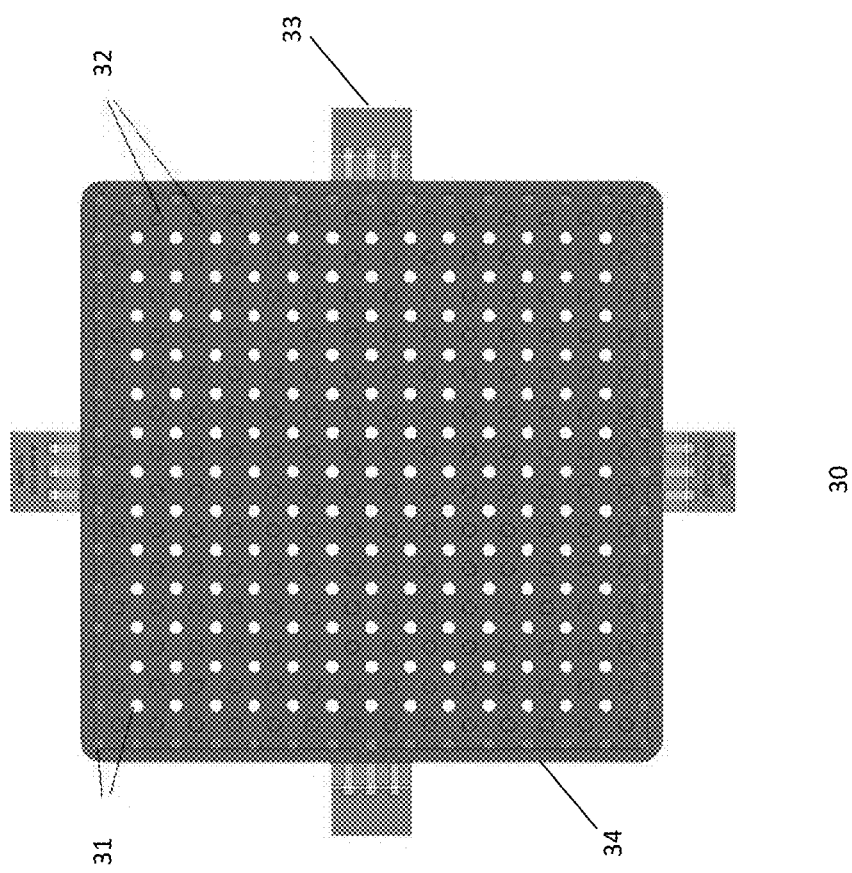
FIG. 5 is a plan view of an intermediate layer, shown in greater detail.

Turning to FIG. 5, the intermediate layer 30 is shown in more detail and in plan view. Layer 30 is an intermediate layer designed to provide one or more advantages including providing structural support, facilitating air venting, mitigating damage to the sensing layer 20 and improving the accuracy in registration of user inputs. In this example, the intermediate layer 30 consists of a plastic substrate which is more rigid than the depressible input layer 10, but other arrangements will be apparent to a person skilled in the art. The intermediate layer 30 thus provides structural and mechanical strength to both the depressible input layer 10 and the stack of layers 101 as a whole.

The intermediate layer 30 comprises a plurality of holes 31 which allow air that is trapped between the intermediate layer 30 and the elastomer input layer 10 to pass through them. This air is then further able to escape the user interface device 100 as a whole by exiting through various openings, as described in more detail below in reference to FIG. 7. The plurality of holes 31 are aligned with the LEDs and also allow light to pass through them, as shown in FIG. 1. Hence, these holes advantageously provide a dual function. To facilitate this, the holes are provided at evenly positioned locations across the intermediate layer. In this arrangement the holes are circular, which assists in providing collimated light at the input surface to be seen by the user.

The intermediate layer 30 further comprises protrusions 32 which act as the force redirection elements 60 that divert input forces towards the sensing areas 22 of the sensing layer 20, as described in reference to FIG. 1. In this example, the protrusions are formed directly on the intermediate layer 30. A mask is used to ensure that the protrusions are in specific positions which correlate to the sensing areas 22 of the sensing layer 20. The protrusions extend from the intermediate layer 30 towards the sensing layer 20. The protrusions are positioned in line with each of the sensing areas such that input force from areas surrounding a protrusion are directed towards a sensing area 21, and away from a non-sensing area 22. Alternate arrangements and types of actuators 60 will be apparent to a person skilled in the art.

The intermediate layer 30 further comprises several tails 33 which are physical tabs that extend from the edges of the layer 30. In this arrangement, a tail is provided on each side of the layer 30, however alternate arrangements are possible. A bezel 34 is disposed around the perimeter of the intermediate layer 30 and comprises a strip of material, in this example plastic, that is lacking in either holes or protrusions. The tails 33 and bezel 34 provide an area whereby the intermediate layer 30 can be connected to the sensing layer 20 only at non-sensing areas of the sensing layer 20, to avoid the transfer of pulling or shear forces to the sensing areas 22 of the sensing layer 20, as described above.

Turning back to FIG. 2, the depressible input layer 10 is connected to the intermediate layer 30 via an adhesive layer 40 that is applied to the top of the intermediate layer 30. In this arrangement, the adhesive layer 40 covers the whole top surface of the intermediate layer 30. This connection ensures that input forces applied to the depressible input surface 10 are accurately mapped onto the intermediate layer 30, which will in turn map them onto the sensing layer 20. In this example, the adhesive layer 40 is applied in a double-sided format such that the top surface comprises a silicone adhesive for bonding with the silicone depressible input surface 10, and the bottom surface comprises an acrylic adhesive to bond with the plastic intermediate layer 30. This has the advantage of providing a good connection to each layer.

However, it will be appreciated that alternative adhesive or mechanical connection mechanisms could be used instead.

The adhesive layer comprises holes at the same locations as the intermediate layer 30, so as not to block light passing through the holes of the intermediate layer 30. In this arrangement, the numerous holes are uniform, circular and are evenly spaced in an array across the surface of the layer 30. In this arrangement, the holes further correspond on a 1:1 basis with the light transmitting areas 22 of the sensing layer 20, as well as the positions of the LEDs 106. However, it will be obvious to a person skilled in the art that for all of the holes described throughout this document a wide variety of hole shapes, positions and alignments are possible.

The intermediate layer 30 is connected to the sensing layer 20 via an adhesive that is printed on an independent layer 50. The adhesive is printed on this independent layer 50 at locations corresponding to the non-sensing areas 22 of the sensing layer 20 and to the tails 33 and bezel 34 of the intermediate layer 30, for the reasons described above. In this example, the adhesive provided is an acrylic adhesive, however, it will be appreciated that alternative adhesive or mechanical connection mechanisms could be used instead.

FIG. 2 also shows an ink layer 70 which has been printed onto the intermediate layer. This ink layer 70 changes the diffusion of light through the device by altering the internal reflections of the light. It also provides a defined aesthetic finish to the user interface device 100 when it is switched off. In this example, the ink has been printed onto both the bottom and top surfaces of the intermediate layer 30, however in some arrangements the ink may only be printed onto either the bottom or top surface.

All the layers situated between the input layer 10 and the sensing layer 20 are configured such that light can pass through them at locations corresponding to the non-sensing areas 22 of the sensing layer 20. This has the advantage that light from a light source situated behind the sensing layer can be transmitted through the non-sensing areas 22 of the sensing layer 20 and pass through the entire layer structure to the depressible input layer 10, as described in reference to FIG. 1. The depressible input layer 10 is translucent, which means that the light can pass through the entire stack of layers 101 to be seen by the user, as further described in reference to FIG. 1.

Figure 6:
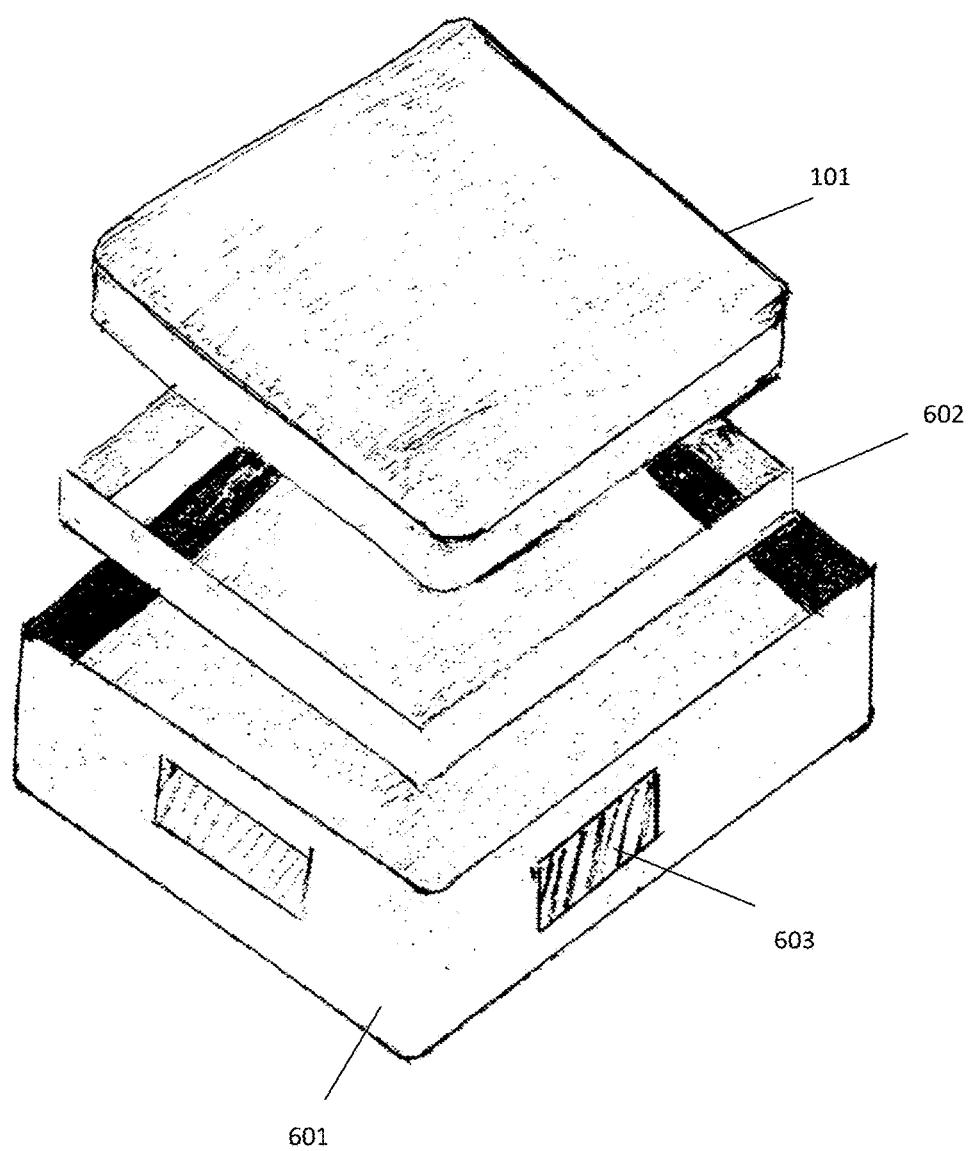
FIG. 6 is an exploded view of the device showing the housing and framing that hold the layers together.

Turning now to FIG. 6, the sensor panel, the PCB and the LEDs are housed in a casing 601, into which the stack of layers 101 is also placed. A frame 602 contains and provides support to the stack of layers 101. In this example the casing 601 and frame 602 are made of plastic, however it will be appreciated that alternative materials could be used. A plurality of ports 603 are provided for data and power input/output functionality.

The operation of the user interface device shall now be described in detail.

The user 107 applies a pressure to the depressible input surface 10 using a finger 102. The input surface is depressed, which causes the pressure to be transferred through the stack of layers, which are each flexible to some extent, towards the sensing layer 20. Inputs from the user onto the depressible input layer via the stack of layers 101 are registered by the sensing layer 20 which sends signals to the PCB. This allows the device to determine a pressure map, from which a region of greatest pressure, and hence the position of activation, can be determined. This can be converted into a more continuous representation, for example the movement of the user's input across the surface. The magnitude, duration and variation with time of the pressure input can be determined at a scanning rate in the order of several hundred times per second. All this information is then relayed to a data processor. The processing software is such that a number of activations, such as multiple finger movements, can be registered simultaneously. These signals can be transferred to a computer via one or more of the ports 603 and software applications can then transform the control signal to produce an audio signal via a loudspeaker. In this example, the ports 603 allow data signals as well as power to be delivered to and from the device 100, however a person skilled in the art will appreciate that various configurations are possible, including ones wherein the processing unit and means for producing an audio signal are all comprised within the device itself, such that a data input/output port is unnecessary for producing the audio signal. A battery included in the device would make even a power port unnecessary.

Figure 7:
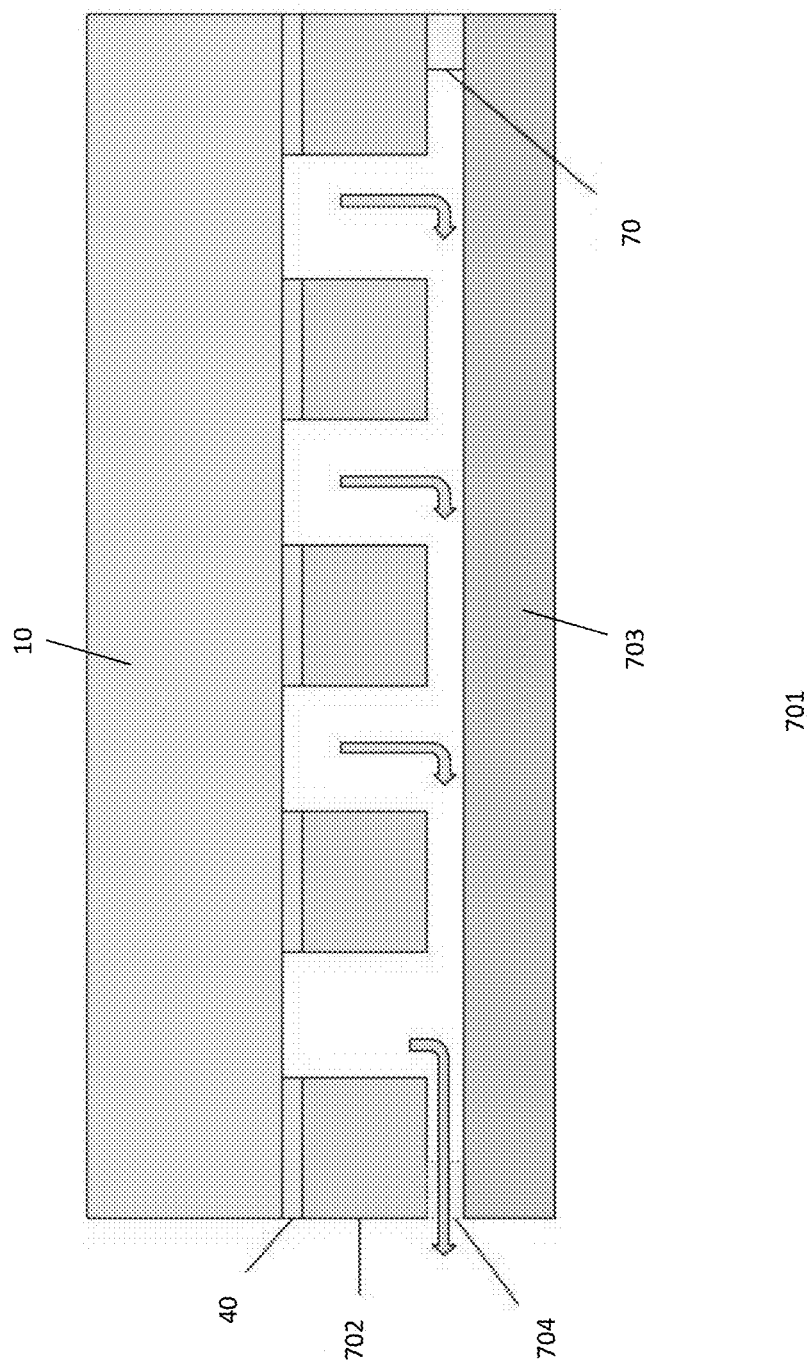
FIG. 7 is a cross section of part of the user interface device and details how air trapped between the input layer and the intermediate layer can escape by passing through holes in the intermediate layer and through openings in the device.

As previously described, the soft, elastic nature of the depressible input surface means that accurate registration of user inputs by the sensor layer 20 can be disrupted by air becoming trapped between the input layer 10 and a layer below it, such as the intermediate layer 30. To help to mitigate this problem, mechanisms by which air can escape from these locations and flow out of the user device are now described in greater detail, with reference to FIG. 7. FIG. 7 shows a cross section 701 of some of the elements of the user interface device 100. The depressible input layer 10 is connected to a first compound layer 702 by the adhesive layer 40. The first compound layer 702 represents the intermediate layer 30, the force redirection element layer 60 and the printed ink layer 70. A second compound layer 703 represents the sensing layer 20, the sensor panel 403, the PCB 404 and the plurality of LEDs 405. The first compound layer 702 is connected to the second compound layer 703 by the adhesive printed on the independent layer 50. The adhesive on this independent layer 50 is provided around the perimeter of the layer and contains a plurality of openings 704 whereby air can escape.

Due to the soft, elastic nature of the input layer 10, the bottom surface of the input layer may move, compress or stretch during use. This may cause air to become trapped between the input layer 10 and the layer beneath it, in this case the first compound layer 702. Any imperfections in the seal provided by the adhesive layer 40 would exacerbate this. Trapped air can cause a loss of sensitivity and accuracy, because inputs through the input layer 10 are distorted before they reach the sensing layer 20. The plurality of holes in the various layers of the first compound layer 702 are provided as a means for this trapped air to escape from underneath the input layer 10, preventing the problems just discussed. The plurality of openings 704 allow this air to further escape from the device as a whole once it has moved away from the input layer 10. The path that trapped air can take to escape from under the input layer out of the device is shown. It will be clear to a person skilled in the art that various arrangements of holes and openings are possible. For example, openings may be located in any number of layers. In another arrangement, the layers comprising the second compound layer 703 may comprise openings such that air can vent out of the bottom of the device.

The above description relates to one arrangement of the user interface device. It will be appreciated by a person skilled in the art, however, that various modifications can be made. For example, a variety of materials can be used to make the different aspects of the device. The depressible input layer could be made from numerous materials that provide differences in the elasticity, tactile feel and the extent to which light can pass through the input layer. Similarly, the intermediate layer, housing and frame can be made from a variety of materials, including but not exclusively any suitable, flexible thermoplastic, acetate, epoxy-paper combination or pressed aluminium shim. Certain materials will lend different aesthetic or tactile qualities to the device, whilst others may modify the function of certain components.

The depressible input surface need not be flat and may have one or more protrusions to define certain areas or certain patterns. For example, the depressible input surface could define an octave structure of a piano or keyboard.

The means by which aspects of the disclosure are connected may be physical or chemical. Physical connections include screws, nails, plugs, clasps or other physical fixings. Chemical connections include adhesives of various types. Aspects of the device can also be moulded as one part or cured directly on to one another. In arrangements where components are connected around a perimeter, this perimeter may define the very edge of the component or it may be inset to some degree. For example, a connective perimeter may itself be confined by a perimeter flange or border.

The sensing layer can be comprised of a multitude of arrangements which allow it to register inputs from a user and determine location, pressure, duration and the like. The arrangement may include an array or grid of sensing elements, an array of elongate sensing strips or comprise a piezoelectric sheet of material. The way in which non-sensing areas are defined will vary depending on the arrangement of the sensing areas. While it is suggested that connections may be made at non-sensing areas only, in some arrangements connections could occur at areas where sensing is possible but currently inactive or reduced.

The actuators generally comprise discrete actuation elements, but the number and nature of these elements can vary based on the desired function, sensitivity, appearance or feel. Examples of actuation elements might include a variety of protrusions, but could also comprise areas of denser material within a layer, which cause transferred forces to be focused at these locations. Further arrangements could include electronic or magnetic arrangements whereby actuation forces are directed towards the desired locations via electronic means or via magnetic repulsion or attraction. In this example, the protrusion actuators extend towards the sensing layer, however it is conceivable that in some arrangements the actuators may extend in an alternate direction, such as towards the depressible input surface. Actuators may be arranged on a layer or layers or between layers.

The light source can comprise a variety of potential components, the number of which may vary. A single light source may be used, for example, if only basic lighting functionality such as backlighting is required. Alternatively, a multitude of light sources may be used. These could comprise LEDs or standard lightbulbs. Alternatively, any number of pixels of a digital display can be used. Natural light could also be used as a light source. The light source(s) can be provided behind the sensing layer, such that light is transmitted through the non-sensing areas. Alternatively, light source(s) can be provided in the same plane as the sensing layer, such that the light source(s) are situated at the non-sensing areas themselves. Alternatively, the light source(s) can be provided in front of the sensing layer, or between any other pairs of layers. The light transmitting areas and holes of the stack of layers 101 through which the light from the light source(s) pass may be an array of discrete holes as described above or alternatively may be a continuous, amorphous distribution of holes and/or light transmitting areas.

Trapped pockets of air are particularly problematic, regardless of whether they are trapped between the depressible input layer and the layer intermediate layer, as described above, or whether they are trapped between the depressible input layer and any other layer or whether they are trapped between the sensing layer and any other layer. As such, the air venting mechanisms described above could be utilised to allow air to escape from any location in the stack of layers of the device.

In certain arrangements a user interface device with only a subset of the above-described features and associated advantages may be provided. For example, for a user interface device that requires the airflow advantages, the light sources and associated structures to allow light to pass through and/or to direct forces towards the sensing areas need not be provided. Alternatively, in arrangements in which the advantage of directing forces towards sensing areas and away from non-sensing areas is required, the features enabling airflow may not be provided. It will be appreciated that the actuators may be provided without the LEDs in certain arrangements and still provide the advantage of improved accuracy of sensing.

The above description relates specifically to an electronic musical instrument. However, it will be appreciated that many of the features disclosed above may be utilised in other applications. In one arrangement, for example, the device may provide an interactive display of an image or piece of graphical data. Alternatively, the device's sensitivity to position and pressure, the controllable degree of friction against the user's finger during movement and the immediate tactile feedback provided ideally suits the sensor to precise control of articulated robotic actuators. From this, applications can be found for improving control of electromechanical systems in automotive, aerospace, industrial, and surgical fields. Numerous other applications will be evident to the skilled person on the basis of the discussions herein.

The invention claimed is:

1. A user interface device comprising:
   a sensing layer for sensing variable input forces and outputting a corresponding variable signal;
   a depressible input layer arranged to receive a touch input from a user and transfer input forces generated by the touch input towards the sensing layer; and
   an intermediate layer arranged between the sensing layer and the depressible input layer, wherein the intermediate layer defines at least one hole through which air from in between the depressible input layer and the intermediate layer can escape.

2. The user interface device according to claim 1 wherein the intermediate layer is a planar sheet having a first planar surface, a second planar surface and an edge and wherein the at least one hole is provided between the first and second planar surfaces.

3. The user interface device according to claim 1 wherein at least the depressible input layer, intermediate layer and sensing layer form a stack of layers and wherein the stack of layers further comprises one or more openings such that air that has escaped from in between the depressible input layer and the intermediate layer can escape from the stack of layers.

4. The user interface device according to claim 3 wherein the intermediate layer is connected to the sensing layer.

5. The user interface device according to claim 4 wherein connection occurs around an edge of the sensing layer.

6. The user interface device according to claim 4 wherein the intermediate layer is connected to the sensing layer via an adhesive.

7. The user interface device according to claim 6 wherein the one or more openings are provided within the adhesive such that air that has escaped from in between the depressible input layer and the intermediate layer can escape from the stack of layers.

8. The user interface device according to claim 6 wherein the adhesive is printed around a perimeter of either side of a first independent layer, this first independent layer being situated between the intermediate layer and the sensing layer.

9. The user interface device according to claim 4 wherein the sensing layer comprises at least one sensing area and at least one non-sensing area, wherein the sensing area is arranged to sense an input from a user and wherein the intermediate layer is connected to the sensing layer only at non-sensing areas of the sensing layer.

10. The user interface device according to claim 9 wherein the at least one sensing area of the sensing layer comprises a plurality of sensing elements arranged in an array, wherein one or more of the sensing elements of the array are adjacent to one or more non-sensing areas of the sensing layer.

11. The user interface device according to claim 9 further comprising one or more force redirection elements arranged to direct the input forces from the depressible input layer towards the at least one sensing area of the sensing layer and away from one or more non-sensing areas of the sensing layer.

12. The user input device according to claim 9 wherein the depressible input layer comprises one or more light transmitting areas at least at the locations corresponding to the non-sensing areas of the sensing layer, wherein the light transmitting areas are arranged to enable light to be transmitted through the depressible input layer.

13. The user interface device according to claim 12 further comprising one or more light sources configured to transmit light through or from at least one of the one or more light transmitting areas of the depressible input layer.

14. The user interface device according to claim 13 wherein all layers and structures below the depressible input layer and above the one or more light source allow at least some light to pass through the respective layers to reach at least some of the one or more light transmitting areas of the depressible input layer to be seen by the user.

15. The user interface device according to claim 1 wherein the intermediate layer is of greater rigidity than the depressible input layer such that it provides support to the depressible input layer.

16. The user interface device according to claim 1 wherein the intermediate layer is also connected to the depressible input layer.

17. The user interface device according to claim 16 wherein the intermediate layer is connected to the depressible input layer via an adhesive that is printed on either side of a second independent layer, this second independent layer being situated between the intermediate layer and the depressible input layer.

18. The user interface device of claim 1 wherein at least the sensing layer, intermediate layer and depressible input layer are arranged in a stack and further comprising a frame around a perimeter of this stack of layers, whereby the frame is configured to support one or more of the stack of layers.

19. The user interface device of claim 1 whereby each of the layers of the user interface device in combination comprise an apparatus for controlling signals and/or parameters in at least three dimensions, wherein a first and second dimension are provided by the capacity of a user to register a touch input across two dimensions of a surface of the depressible input layer, and a third dimension is provided by the capacity of a user to register a touch input by means of variable pressure directed perpendicularly into the depressible input layer.

* * * * *